Sept. 3, 1963 W. G. GROSSMANN 3,102,450
APPARATUS FOR OPTICALLY PRINTING PHOTOGRAPHIC NEGATIVES
Filed Nov. 18, 1960
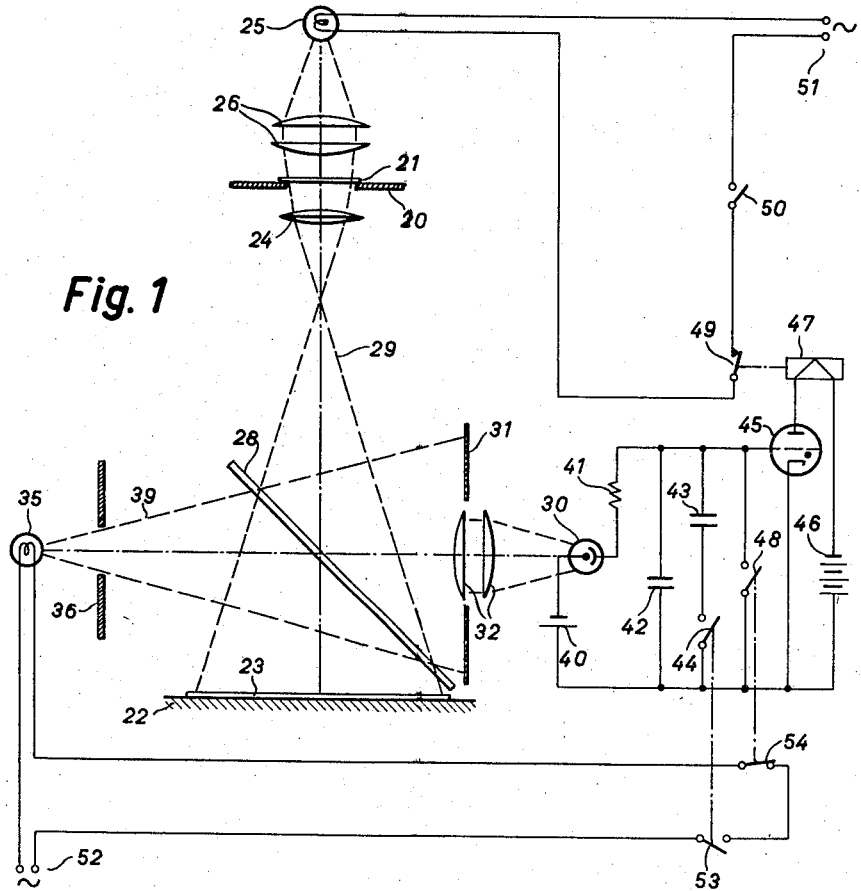
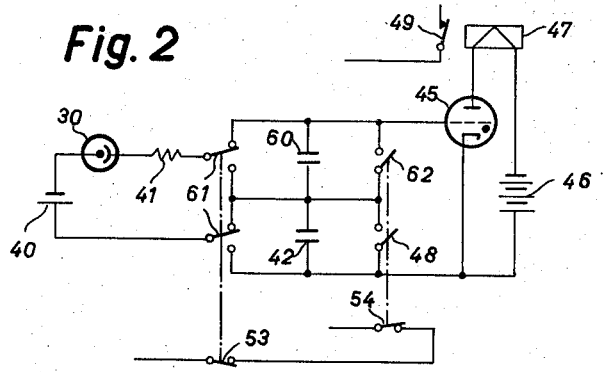
Inventor
Walter G. Grossmann
By
Watson, Cole, Grindle + Watson
Attys.

United States Patent Office 3,102,450
Patented Sept. 3, 1963

3,102,450
APPARATUS FOR OPTICALLY PRINTING PHOTOGRAPHIC NEGATIVES
Walter G. Grossmann, Oberengstringen, Zurich, Switzerland, assignor to Autokopie A.-G., Zurich, Switzerland
Filed Nov. 18, 1960, Ser. No. 70,243
Claims priority, application Germany Nov. 19, 1959
1 Claim. (Cl. 88—24)

The invention relates to an apparatus for the optical printing of photographic negatives and the expression "printing" is not intended to establish the scale of reproduction as 1:1, so that therefore the so-called "enlargement" and "reduction" are also included therein.

For the purpose of varying gradation, it is known that the light-sensitive, photographic positive material can be initially exposed to a certain degree with diffused light and thereafter exposed through the projected negative image. The degree of pre-exposure is chosen to conform to the range of brightness contrast of the negative to be printed, whereas the main exposure through the projected negative image depends on the density of the negative. In principle, it is also possible to carry out the exposure with the diffused secondary light after the main exposure. The total light exposure, which is composed of the main exposure and the secondary exposure, should in all cases reach and not substantially exceed the exposure necessary to produce an image of normal density.

In order to achieve this object in a convenient manner, apparatus having an automatically operating photometer have been provided which determine the quantity of the diffused secondary exposure and of the main exposure and control the total exposure time in accordance therewith. Known apparatus of this type consist for example substantially of a negative holder, a positive holder for a light-sensitive, photographic positive material, an object for forming an image of the negative on the positive material, a main light source for illuminating the negative to be printed so as to expose the positive material with main light, a secondary light source for the additional uniform exposure of the positive material with diffused secondary light, a photoelectric converter on to which falls a measured component of the main light and a measured component of the secondary light, and a regulating device connected to the photoelectric converter and having means for automatically controlling the exposure time of the main light. The invention is likewise concerned with an apparatus of this type.

In some of the known apparatus, the photoelectric converter or cell is disposed behind the light-sensitive positive material which transmits some of the incident main and secondary light, or the converter or cell is arranged at a certain distance above the front side of the positive material and outside the path of rays and in this case measures the light reflected in diffused form by the positive material. Other known apparatus comprise a semi-transparent mirror between the objective and the positive holder, this mirror being inclined at an angle of 45° in relation to the optical axis of the path of rays. This mirror allows passage of half of the main light to the light-sensitive positive material and reflects the other half of the main light to the photoelectric cell; in addition, the mirror reflects half of the secondary light to the positive material, while it permits the other half of the secondary light to reach the photoelectric cell.

In all the said prior known apparatus, the measuring components of the main light and secondary light were received in similar manner by the photoelectric exposure regulating means which could not distinguish between the main light and secondary light. Both exposures were thus similarly evaluated and therefore had the same influence on the means for controlling the exposure time of the main light. This is a disadvantage in many cases and restricts the possible uses of the apparatus. For example, it can be proved by sensitometry that because of the deflection of the gradation curve resulting from strong pre-exposure by the secondary light, the pre-exposed images appear somewhat darker than those images which have not been pre-exposed, when the main light and the secondary light have been equally evaluated by the regulating means. Better results would be obtained if, with increasing pre-exposure, the sum of the main light and secondary light were to be somewhat reduced. It is an object of the present invention to make this possible.

Another object of the invention is to make it possible, with the aforementioned apparatus, comprising a partially transparent mirror, to shorten the time for the exposure with the main light by increasing the permeability of the mirror. However, this measure had formerly led to insurmountable difficulties, because thereby a larger measurement component of the secondary light is also transmitted by the mirror to the photoelectric cell and in addition a smaller measurement component of the main light is reflected by the mirror to the photoelectric cell and a smaller component of the secondary light is reflected on to the light-sensitive positive material.

These two problems on which the invention is based can be solved by the apparatus according to the invention, which is characterised essentially by the provision of at least one component which can be switched over for producing a differential influence of the main light and of the secondary light on the regulating device.

Further features of the invention will be apparent from the claim, the specification and the accompanying drawing, in which are illustrated by way of example one embodiment of the invention and also a modification thereof.

FIG. 1 shows diagrammatically the first embodiment;
FIG. 2 shows a modification of the electrical part of the embodiment.

The optical printing apparatus illustrated in FIG. 1 comprises a negative holder 20 for a negative 21 which is to be printed and also a positive holder 22 for a light-sensitive photographic positive material 23. The holders 20 and 22 can be of any known design. Located between the two holders 20 and 22 is an objective lens 24, by means of which the image on the negative 21 is projected in focus on to the light-sensitive layer of the positive material 23. Provided for illuminating the negative 21 is a main light source 25 in the form of an incandescent electric lamp, which projects its light by way of a double condenser lens 26 through the negative 21.

Arranged between the objective 24 and the positive material 23 is a partially transparent mirror 28, this being at an angle of 45° relatively to the optical axis of the objective lens 24. A proportion exceeding 50% of the main light 29 passing through the negative is transmitted through this mirror 28 to the positive material 23, whereas the remaining proportion of the main light 29, apart from the negligible losses in the mirror are reflected by the latter towards a photoelectric converter 30, which is for example a photoelectric resister, the electircal conductivity of which increases proportionally with increasing illumination. Some of the light thus reflected is masked out by a diaphragm 31, while the remainder of the measurement component of the main light used for measuring the exposure is concentrated by a lens system 32 on to the photoelectric converter 30.

Disposed on that side of the mirror 28 remote from the converter 30 and in the optical axis of the lens system 32 is a secondary light source 35, which is also formed by an incandescent electric lamp. The secondary light 39 passing through a diaphragm 36 is partly reflected by the mirror 28 on to the positive material 23, for the purpose of a diffused pre-exposure of the material 23, and partly transmitted by the mirror 28 to the photoelectric converter 30. That proportion of the secondary light 39 transmitted by the mirror 28 exceeds 50%, while the reflected proportion of the secondary light is below 50%.

The mirror 28 comprises a differential transmission factor for the main light and also for the secondary light to the positive material 23 and to the photoelectric converter 30.

If the mirror 28 has a transmission factor of $n\%$, then disregarding the losses occurring in the mirror, the mirror 28 has a reflection power of $(100-n)\%$. This means that the illuminating proportion of the main light 29 which is incident on the positive material 23 is in a ratio of $$\frac{n}{100-n}$$

in relation to the corresponding illuminating proportion of the secondary light 39 and that the measurement component of the main light 29 incident on the photoelectric converter 30 has a ratio of $$\frac{100-n}{n}$$

relatively to the corresponding measurement component of the secondary light 39. As intended, the main light 39 thus has a greater influence on the positive material than the secondary light 39; conversely, however, the influence of the secondary light on the photoelectric converter 30 is greater than the corresponding influence of the main light. If the aim is to have the same action of the main light and of the secondary light on the positive material 23, a ratio of $$\left(\frac{100-n}{n}\right)^2$$

is produced between the measurement component of the main light which is incident on the converter 30 and the corresponding measurement component of the secondary light. When measuring the exposure, this ratio must be taken into account if correct results are to be produced. In the apparatus described according to the invention, this ratio is allowed for in an electrical integration circuit, which is hereinafter described.

One terminal of a direct current source 40 is directly connected to a charging condenser 42, while the other terminal thereof is connected to the said condenser by way of the photoelectric converter 30 and a resistance 41, and a second charging condenser 43 can be connected in parallel with the condenser 42 by means of a switch 44. The condenser 42 is connected between the cathode and the control grid of a thyratron valve 45. Connected between the cathode and the anode of the valve 45 are a current source 46 and the winding of a relay 47. Connected in parallel with the charging condenser 42 is a switch 48, by means of which the condenser 42 can be bridged for the purpose of discharging. A normal contact 49 of the relay 47 and a switch 50 are connected in the feed circuit of the main lighting source 25 which is connected by way of a terminal 51 to the lighting mains. The secondary light source 35 is connected in similar manner to the lighting mains by means of terminals 52. Two switches 53 and 54 are included in the feed circuit of the secondary lighting lamp 35, one switch 53 being mechanically coupled to the switch 44 already mentioned, so that always both switches are simultaneously opened or closed. The switch 54 on the other hand is so coupled to the switch 48 that these two switches are alternately opened and closed.

The charging condenser 42 has a capacitance $C_1$ and the charging condenser 43 has a capacitance $C_2$. In order when using the integration circuit which has been described to be able to balance the differential transmission factor of the mirror 28 for the secondary light and the main light to the photoelectric converter 30 and to the positive material 23, the following condition must be satisfied:

$$\frac{C_1}{C_1+C_2}=\left(\frac{100-n}{n}\right)^2$$

or $$C_2=C_1\left(\frac{n}{100-n}\right)^2-C_1$$

The use and operation of the apparatus which has been described is as follows:

After the negative 21 and the light-sensitive positive material 23 have been mounted on the corresponding holders 20 and 22, first of all the switch 48 is closed, the switch 54 being simultaneously opened. The two switches 44 and 53 are then closed. The two condensers 42 and 43 are completely discharged by way of the switch 48. The switch 48 is then opened, and at the same time the circuit of the secondary lighting source 35 is closed by means of the switch 54. The secondary lighting source 35 produces a diffused light 39, some of which is reflected at the mirror 28 to the positive material 23 and pre-exposes the latter. A certain measurement component of the secondary light 39 passes through the mirror 28 to the photoelectric converter 30, which becomes electrically conducting corresponding to its illumination. A current then flows from the current source 40 to the condensers 42 and 43 which are connected in parallel with one another, whereby these condensers become increasingly charged. After a predetermined period of time, which is selected on the basis of experience according to the photographic properties of the positive material 23 and the contrast range of the negative 21, the two switches 44 and 53 are opened. By this means, the secondary light is switched off, and the condenser 43 is disconnected from the condenser 42.

Immediately thereafter, the switch 50 is closed and thereby the main lighting source 25 is made operative. Some of the main light 29 passes through the mirror 28 to the positive material 23, whereby the latent image of the negative 21 is produced thereon. A measurement component of the main light 29 is however reflected at the mirror 28 on to the photoelectric converter 30, which again becomes electrically conducting, corresponding to its illumination. By means of the current source 40, the condenser 42 is thereby recharged. Since the capacitance $C_1$ of the condenser 42 is smaller than the capacitance $C_1+C_2$ of the parallel-connected condensers 42 and 43, in the case of the pre-exposure, the charging now takes place by the factor $$\left(\frac{n}{100-n}\right)^2$$

more quickly than with the pre-exposure, provided the same light intensity is incident on the positive material 23. The speed of the charging and the illumination of the positive material 23 are however dependent on the density of the negative 21.

As soon as the voltage at the condenser 42 reaches the value of the igniting voltage of the thyratron valve 45, this valve becomes electrically conducting, whereby the anode-cathode circuit of the valve is closed. By means of the current source 46, the relay 47 is then energized, the contact 49 of this relay breaking the feed circuit of the main lighting source 25. The denser the negative 21 or the shorter the pre-exposure, the longer lasts the exposure by the main lighting source 25. The total exposure of the positive material 23, which results from the sum of the pre-exposure and of the main exposure with the indicated measurement of the separate parts, is always the same and dependent on the illumination power of the lighting sources 25 and 35, the duration of the pre-exposure, the density of the negative 21 to be printed and the adjusted reproduction scale.

By closing the switches 48 and 44, the two condensers 42 and 43 are discharged again, the current flux through the thyratron valve 45 also being broken. Thereafter, the apparatus is ready for a fresh operation.

In certain cases, it can be advantageous also to couple the switch 50 with the switch 44, so that the lighting sources 25 and 35 for the main light and the secondary light, respectively, are switched over simultaneously with the switching over of the integration circuit.

For example, if the scale of reproduction is reduced by the negative holder 20 with the negative 21 and the main illuminating device 25, 26, together with the objective 24, being brought closer to the positive holder 22, no additional measures have to be allowed for as regards the exposure. The pre-exposure can last exactly the same length of time, provided the positive material 23 has the same photographic properties and the negative 21 has the same range of contrast; all else is automatically and correctly controlled by the electrical integration circuit.

The modification of the embodiment as illustrated in FIG. 2 differs from the example which has been described merely by another construction of the electrical integration circuit. In so far as corresponding structural elements are concerned, the same reference numerals as in FIG. 1 are used in FIG. 2. Whereas in principle only a single integration member with two charging condensers 42 and 43 is provided in the first example, it being possible for the condenser 43 to be switched on and off, the constructional example according to FIG. 2 comprises two separate and different integration members for the measurement component of the secondary light and for that of the main light, each member containing one charging condenser 42 or 60. The two condensers 42 and 60 can be connected at will, by means of a double-pole switch 61, to the series circuit comprising the current source 40, the photoelectric converter 30 and the resistance 41, so that always only one of the condensers 42 and 60 can be charged. The two charging condensers 42 and 60 are however connected in series between the cathode and the control grid of the thyratron valve 45. The effect achieved in this way is that the sum effect of the two integration members is responsible for the igniting of the thyratron valve 45 and for switching off the main light source. Connected in parallel with each of the condensers 42 and 60 is a switch 48 and 62, respectively, by means of which the corresponding condenser can be bridged over for discharging purposes. The two switches 48 and 62 are preferably mechanically coupled to one another and to the switch 54. The change-over switch 61, on the other hand, is advantageously coupled to the switch 53. All other components of the apparatus are the same as in the first constructional example.

The condenser 42 has the capacitance $C_1$, whereas the condenser 60 has a larger capacitance $C_3$. In order to balance the differential transmission factor of the mirror 28 for the secondary light and the main light to the photoelectric converter 30 and to the positive material 23, the following condition must be maintained:

$$C_3 = C_1 \left(\frac{n}{100-n}\right)^2$$

The operation of the modification according to FIG. 2 is as follows:

With the pre-exposure, the condenser 60 is connected to the current source 40 by means of the change-over switch 61. The converter 30 permits the flow of a current corresponding to its illumination, whereby the condenser 60 is charged up to a certain voltage. For terminating the pre-exposure, the switch 61 is changed over and at the same time the switch 53 is opened. By this means, the other condenser 42 is connected to the current source 40 and the circuit to the secondary lighting source is broken. With the subsequent main exposure, the condenser 42 experiences a charging, corresponding to the illumination of the converter 30. Obtaining between the cathode and the grid of the thyratron valve 45 is the sum of the terminal voltages at the two condensers 42 and 60. As soon as this sum voltage is sufficiently high, the thyratron valve 45 ignites, whereby the relay 47 is energised and the feed circuit of the main lighting source is broken by means of the contact 49. The total exposure of the positive material is thus automatically controlled to the desired value in this case as well. By closing the switches 48 and 62, the two condensers 42 and 60 are discharged and the thyratron valve is extinguished. Thereafter, the apparatus is ready for a fresh operation.

It is obvious that many other embodiments of the electrical integration circuit are possible, but these are known per se and consequently do not have to be explained here. For example, in the embodiment according to FIG. 1, it would be possible to use only one charging condenser 42 and to connect in different resistances 41 for the pre-exposure and the main exposure. Instead of being effected by the light sources for the main and secondary lighting systems being switched on and off, the control of the illumination can also be effected by means of shutters which are able to interrupt the path of rays of the main and secondary lighting systems. In particular, it is advantageous to control the secondary lighting by such a shutter by means of an adjustable clockwork mechanism.

What I claim is:

Apparatus for optically printing photographic negatives, comprising a negative holder, a positive holder for a light-sensitive photographic positive material, an objective for forming an image of the negative to be printed on the positive material, a source of main light for illuminating the negative, a source of secondary light, a photoelectric converter, a semi-transparent mirror disposed at an angle of 45 degrees in the path of rays between the negative holder and the positive holder and between the source of secondary light and the photoelectric converter, said mirror having a transmission factor which is larger than its reflecting factor, and transmitting a portion of the main light onto the positive material for exposure thereof for printing the image, and reflecting a smaller measurement portion of the main light onto said photoelectric converter, said mirror reflecting a portion of the secondary light onto the positive material for an additional uniform pre-exposure thereof, and transmitting a larger measurement portion of the secondary light to said photoelectric converter, means to switch on the source of secondary light for a time duration chosen at will, and an electric control device connected to said photoelectric converter and automatically controlling the time during which the positive material is exposed to the main light, said control device functioning in response to the total quantity of light falling onto the photoelectric converter of the measurement portions of both the main light and the secondary light, and including means for reducing the over-all sensitivity of the control device during pre-exposure with the secondary light and increasing the sensitivity during exposure with the main light to compensate for the different effects of the light transmission factor and the light reflecting factor of the mirror on the measurement portions of the main light and the secondary light.

References Cited in the file of this patent

UNITED STATES PATENTS

| | | |
|---|---|---|
| 2,353,218 | Burnham et al. | July 11, 1944 |
| 2,444,675 | Rath | July 6, 1948 |
| 2,484,299 | Labrum | Oct. 11, 1949 |
| 2,965,814 | Gartner | Dec. 20, 1960 |

FOREIGN PATENTS

| | | |
|---|---|---|
| 845,458 | Great Britain | Aug. 24, 1960 |
| 1,183,771 | France | Feb. 2, 1959 |